Aug. 5, 1969 J. W. LECHLEIDER 3,460,068

INSTANTANEOUS COMPANDOR UTILIZING THE SAMPLED PULSE RESPONSE OF A LINEAR TIME-INVARIANT NETWORK

Filed June 10, 1965 2 Sheets-Sheet 1

INVENTOR
J. W. LECHLEIDER
BY Charles D. Call
ATTORNEY

United States Patent Office 3,460,068
Patented Aug. 5, 1969

3,460,068

INSTANTANEOUS COMPANDOR UTILIZING THE SAMPLED PULSE RESPONSE OF A LINEAR TIME-INVARIANT NETWORK

Joseph W. Lechleider, Murray Hill, N.J., assignor to Bell Telephone Laboratories, Incorporated, New York, N.Y., a corporation of New York Filed June 10, 1965, Ser. No. 462,969
Int. Cl. H03k *7/08*
U.S. Cl. 332—11 5 Claims

ABSTRACT OF THE DISCLOSURE

Samples from an input signal are converted by a pulse-width modulator into a sequence of constant amplitude pulses each of which has a width proportional to the amplitude of its respective sample. The pulses are applied to a linear time-invariant network the output of which is sampled at or near the conclusion of each applied pulse to provide output samples having the desired nonlinear relationship with respect to the input samples. After the output of the network is sampled and before a new pulse is applied thereto, initial conditions are returned in the network by discharging all reactances in the network such that each applied pulse causes the network to produce a step response at its output.

This invention relates to nonlinear electrical networks and, more specifically, to electrical networks which exhibit a transfer gain that is functionally related to the amplitude of the input signal applied to the network.

It is a principal object of the invention to reduce noise in communication systems by instantaneous "companding" (that is, by jointly compressing and expanding) the instantaneous message signal amplitude.

In PCM systems, the analog message signal is periodically sampled and binary code words, each indicative of the amplitude of a particular sample, are transmitted. Because a code word having only a limited number of digits cannot be expected to exactly specify the amplitude of any given sample, the range of possible sample amplitudes is broken up into a finite number of levels or "quantizing steps." The amplitude of each signal sample is then compared with this ladder-like array of levels and all amplitudes falling within any given step are replaced by a single value uniquely characterizing that step. This process of quantization, involving as it does the representation of a bounded continuum of values by a finite number of discrete values, gives rise to errors of approximation. These deliberate errors cause "quantizing noise" which, in a properly operating PCM link, constitutes one of the principal sources of message signal impairment.

Companding may be employed to reduce quantization noise. The principle of companding is based upon the realization that the severity of quantization noise may be reduced by providing finer-grained approximations for those amplitudes where the signal is most likely to exist and rougher approximations for those amplitudes where the signal exists only seldomly. For example, when repeated measurements of the instantaneous amplitude of an electrical speech signal are made, it is found that most of the measured values are in the neighborhood of the average of "zero" value. Because of this probability distribution, the quantization noise for a speech signal is decreased by providing more quantization steps for signals near the zero level and fewer for larger amplitude signals.

As is well known in the art, companded code words may be generated with the combination of a conventional coder having equally spaced quantization levels and a companding network which is interposed between the speech signal source and the coder. The companding network preferentially amplifies the weaker signals. Thus, in relation to each other, weaker signals are expanded while stronger signals are compressed. The lower amplitude range is consequently spread over a greater number of quantizing levels thus providing closer approximations for weaker signals.

In a principal aspect, the present invention takes the form of a nonlinear network having a transfer gain which is dependent upon the magnitude of the applied input signal. According to a feature of the invention, the input signal is converted into a train of width-modulated pulses, the width of each pulse being proportional to the amplitude of the input signal at a sampling instant. This train of pulses is then applied to a transfer network such as a simple R-C low pass filter. The output signal from the network is sampled after the application of the input pulse. If desired, the resultant samples may then be coded directly into companded PCM or, alternatively, may be passed through a low pass filter to produce a companded analog signal. A variety of compression characteristics may be realized, depending upon the response characteristics of the chosen transfer network.

These and other objects, features and advantages of the present invention may be better understood by considering the following detailed description of a specific embodiment of the invention. Reference will be made in the text of this description to the attached drawings in which.

Figure 1:
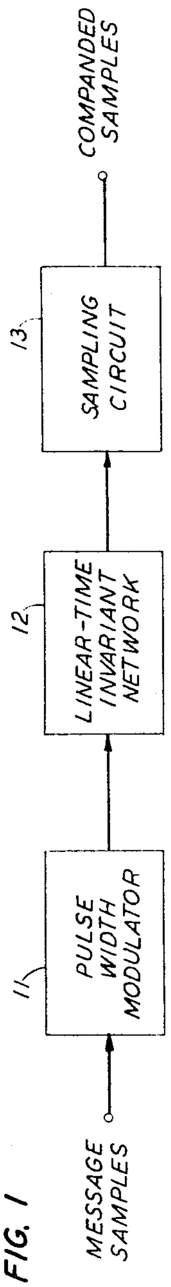
FIG. 1 illustrates the basic companding method according to the present invention in simplified block diagram form.

The basic companding scheme contemplated by the present invention is shown in simplified form in FIG. 1 of the drawings. The input signal to the companding arrangement is a series of analog message samples which may be multiplexed, on a time-division basis, with samples of other message signals. These samples are applied to the input of a pulse-width modulator 11. Modulator 11 converts the amplitude-modulated pulses into a second sequence of pulses, all of the same amplitude but having widths that are proportional to the amplitude of respective ones of the incoming samples.

The width-modulated pulses from modulator 11 are applied to a linear, time-invariant network 12. The term "linear" in this instance means that the amplitude of the output waveform is proportional to the amplitude of the input waveform. By "time invariant," it is meant that the network exhibits the same properties at all times. During the time one of the pulses is being applied to the linear network 12, however, the amplitude of the output voltage from the network is a nonlinear function of time. Simple RC or RL networks are examples of "linear" networks which produce nonlinear waveforms in response to applied step functions. At or near the conclusion of the applied pulse, the output voltage from network 12 is sampled by the circuit 13 which produces companded samples having the desired nonlinear amplitude relationship with respect to the input samples.

Figure 2:
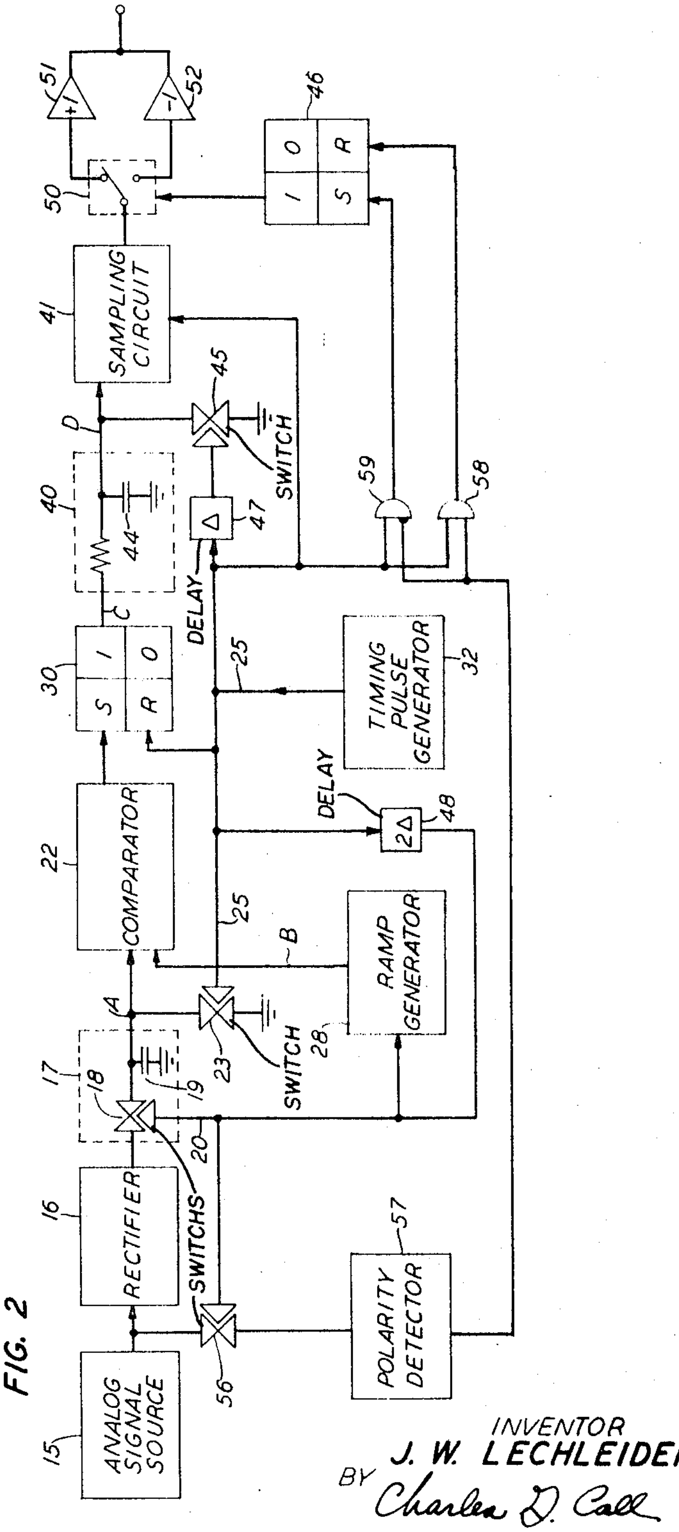
FIG. 2 shows a more detailed embodiment of the invention adapted for connection between an analog message source and a conventional PCM encoder.

FIG. 2 shows a more detailed schematic drawing of an embodiment of the invention. The signal to be companded is obtained from a source 15, rectified by a rectifier 16, and applied to a sample-and-hold circuit 17 which includes a transmission gate 18 and a holding capacitor 19. The application of a control pulse via conductor 20 opens the gate 18 for a brief interval to allow the holding capacitor 19 to charge to the message signal potential. The amplitude-modulated sample pulses appearing at the output of the sample-and-hold circuit 17 are applied to a first input of a comparator 22. A pulse-responsive switching element 23 is connected in parallel with the holding capacitor 19. When conductor 25 is energized, switch 23 is actuated momentarily to discharge the holding capacity 19.

Figure 3A:
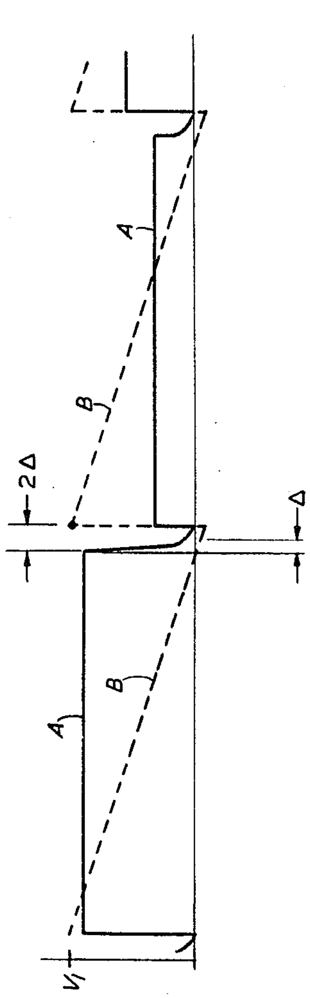
FIGS. 3A and 3B show voltage waveforms which illustrate the operation of the arrangement shown schematically in FIG. 2.

The control pulses appearing on conductor 20 are also applied to a ramp function generator 28. Generator 28 produces sawtooth-shaped voltage which is applied to a second input to the comparator 22. The relative amplitudes and shapes of the voltage waveforms applied to the two inputs to comparator 22 are shown in FIG. 3A of the drawings. Waveform A is the sample voltage from circuit 17 which appears at point A in FIG. 2. Waveform B is the ramp function from generator 28 as it appears at point B in FIG. 2. The comparator 22 generates an output pulse at the moment the ramp voltage B decreases to a voltage equal to the sample voltage A. This output pulse is applied to the "set" input of a flip-flop circuit 30. The "reset" input of flip-flop 30 is connected via conductor 25 to a timing pulse generator 32 which produces pulses at a repetition rate equal to the sampling rate. The flip-flop 30 is thus reset at a fixed time with relation to the cycle of operation whereas it is initially set at a time which is related to the sample amplitude from circuit 17. As a result, the flip-flop 30 generates an output pulse having a duration directly proportional to the sample amplitude.

These width-modulated pulses are applied to a linear, time-invariant network such as the simple RC low pass filter 40 shown in FIG. 2. The width-modulated pulse waveform applied to the input of network 40 is shown as the solid line C in FIG. 3B. In response to each applied pulse, the network 40 produces an output voltage having the form $E(1-e^{-at})$ as illustrated by the dotted line waveform D in FIG. 3B. This nonlinear waveform is sampled by the sampling circuit 41 (which may be identical to the sample-and-hold circuit 17) in order to produce the compressed samples which may be applied to a conventional linear coder.

The network 40 includes a capacitor 44 which must be discharged after sampling is completed. For this purpose, a pulse operated switch 45 is connected in parallel with the capacitor 44. Actuating pulses are applied to switch 45 from generator 32 through a delay unit 47. In a like manner, actuating pulses are applied from generator 32 through a delay unit 48 to the switch 18 in sample-and-hold circuit 17.

Figure 3B:
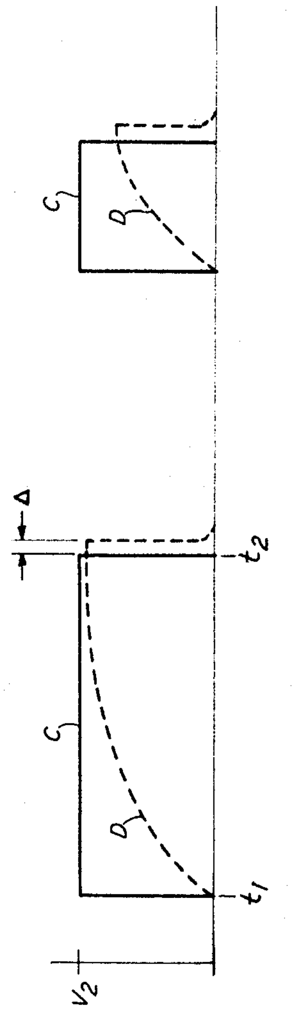

A better understanding of the sequence of operations performed by the circuit of FIG. 2 may be obtained by considering FIGS. 3A and 3B. At the time $t_1$ when the voltage from ramp generator 28 falls to a level equal to the sample voltage, the comparator 22 generates a pulse which sets the flip-flop 30. At this time, the capacitor 44 in network 40 begins to charge exponentially. At the time $t_2$, generator 32 produces a timing pulse which actuates switch 23 to discharge the holding capacitor 19, as is illustrated by the immediate drop in the sample waveform A in FIG. 3A. Also at time $t_2$, the output voltage from network 40 is sampled by the sampling circuit 41, and the flip-flop 30 is reset to terminate the width-modulated pulse applied to network 40. Of course, sampling by circuit 41 and the resetting of flip-flop 30 need not be done simultaneously. $\Delta$ seconds after $t_2$, the switch 45 is closed to discharge capacitor 44. This delay time is introduced by the delay unit 47 in order to allow adequate time for sampling. Two $\Delta$ seconds after $t_2$, the gate 18 is opened momentarily to charge holding capacitor 19 to the new sample potential and ramp generator 28 is triggered once again up to the voltage $V_1$. It should be noted that the peak voltage level $V_1$ from ramp generator 28 should be at least equal to the maximum sample amplitude appearing across capacitor 19.

Because the input signal to the sample-and-hold circuit 17 is rectified, it is necessary to reinvert samples which were originally negative. This is accomplished by the combination of a double-throw switching element 50 and a pair of amplifiers 51 and 52. Switching element 50 is controlled by the state of a flip-flop 46 which is either set or reset at the time $t_2$. The analog signal from source 15 is monitored at the instant of sampling by circuit 17 by means of the combination of the momentary contact switching element 56 and polarity detector 57. When the sample is negative, the detector 57 (which may comprise a conventional bistable multivibrator type threshold detector) delivers a sustained output pulse to one input of an AND gate 58 and the inhibit input of INHIBIT gate 59. The remaining inputs to gates 58 and 59 are connected directly to the timing pulse generator 32. Thus, if the sample being processed was negative, a pulse is gated through to the output of AND gate 58 which is connected to the reset input of flip-flop 46. In the reset state, flip-flop 46 sets switching element 50 in the lower position such that the output sample is passed through the inverting amplifier 52. If the sample is positive, gate 59 is not inhibited and a pulse passes from generator 32 to the set input of flip-flop 46. In this state, the switching element 50 is applied to the output sample from circuit 41 to the input of the positive gain amplifier 51.

As will be readily appreciated by those skilled in the art, numerous modifications may be made to the specific embodiment shown in FIG. 2. For example, to provide a different companding characteristic, the width-modulated pulses applied to the transfer network may be made inversely proportional to the input sample amplitudes. In addition, a wide variety of networks having a nonlinear waveform response to the applied width-modulated pulses may be employed in order to achieve a variety of companding characteristics. Furthermore, the leading edges of the applied pulses may be evenly spaced in time. In this instance, the time of sampling the network output may be varied with respect to the leading edge of the applied pulse in response to input sample amplitude changes. These and other modifications may be readily made by those skilled in the art without departing from the true spirit and scope of the invention.

What is claimed is:

1. Apparatus for producing output samples having a desired nonlinear relationship with respect to input samples comprising means responsive to said input samples for generating constant amplitude pulses each of which has a width proportional to its respective input sample, a transfer network having an input, an output and at least one reactive element, means for applying said constant amplitude pulses to the input of said transfer network, means for sampling the amplitude output of said transfer network after the application of a pulse to its input, and means for discharging said reactive element in said transfer network after the output of said network has been sampled and before the application of the next pulse to the input of said network.

2. Apparatus as defined in claim 1 wherein said transfer network is a low pass filter having at least one capacitive element.

3. In combination, a transfer network having an input and an output, means for applying a step waveform to the input of said network at a first time, first sampling means for determining the instantaneous amplitude of the response waveform appearing at said output at a second time, a source of an analog signal, second sampling means for determining the instantaneous amplitude of said analog signal, and means responsive to said second sampling means for controlling the time duration between said first and said second times in accordance with the said instantaneous amplitude of said analog signal.

4. A combination as set forth in claim 3 including means connected to said first sampling means for generating a digital code word representative of said instantaneous amplitude of said response waveform.

5. Apparatus as set forth in claim 3 wherein said network is a linear, time-invariant network and wherein said response waveform has an amplitude which is a nonlinear function of time.

References Cited

UNITED STATES PATENTS

| | | | |
|---|---|---|---|
| 3,181,074 | 4/1965 | Cotterill | 328—142 |
| 3,207,986 | 9/1965 | Bailey | 332—15 X |

ALFRED L. BRODY, Primary Examiner

U.S. Cl. X.R.

325—142; 328—58, 142; 332—15